UNITED STATES PATENT OFFICE.

HENRY BAGGELEY, OF FULHAM, ASSIGNOR TO JOHN STUDDY LEIGH, OF LONDON, ENGLAND.

IMPROVEMENT IN COMPOUNDS FOR MANUFACTURING CRUCIBLES.

Specification forming part of Letters Patent No. 179,502, dated July 4, 1876; application filed May 6, 1876.

*To all whom it may concern:*

Be it known that I, HENRY BAGGELEY, of Fulham, England, manufacturing chemist, have invented an improved compound, chiefly designed for the manufacture of crucibles, retorts, and other vessels and apparatus to be employed for chemical purposes, of which the following is a specification:

My invention relates to a novel compound, which is designed to furnish a material for the construction of crucibles, retorts, vats, pans, and other vessels or apparatus for chemical and other processes and operations, and for other purposes, wherein it is desirable to employ a material capable of resisting the action of heat and strong acids and other destructive influences.

The said improved compound will be found superior to other compounds and materials heretofore available for the construction of chemical vessels and apparatus, inasmuch as it will resist extreme variations of temperature better than porcelain or any other known crucibles, and at the same time stand the action of the strongest acids and other chemicals better than any known metal.

My improved compound consists of the following ingredients, namely: fire-clay, Cornwall stone, or any other stone of an analogous nature, calx, or the calcined residue of zaffer or other similar substance, calcined bone-dust, and burnt-clay dust. I prefer to combine these materials in about the proportion of two hundred pounds of fire-clay, twenty-two pounds of Cornwall stone, one pound of calx, two pounds of bone-dust, and ten pounds of the fired or burnt clay dust; but I vary the proportions within certain limits, according to the nature of the substance to be contained in the various vessels.

To these materials I sometimes add a small quantity of asbestus and silicate of alumina; but I do not consider these last-named substances to be of any very great importance or advantage in the making of the said compound.

The two essential ingredients are fire-clay and Cornwall stone, (sometimes called china-stone,) or other similar stone. These two materials have never been so mixed together before as to form a proper vitrified body to resist the penetration of liquids. The other ingredients are not absolutely essential, but are advantageous for my purpose; and it is convenient to add silicate of soda or other suitable glazes.

The materials or ingredients of the said compound are combined or mixed in any suitable vessel with a proper quantity of water to form a paste. This paste is worked into the required form for the crucibles, retorts, or other vessels or articles, which are burned or baked at a temperature which varies according to the nature of the said vessels or articles, and they are then ready for use for the purposes above specified or other purposes.

I claim as my invention—

In a compound for the manufacture of crucibles, retorts, and other similar vessels, the combination of Cornwall or china stone, calx, bone-dust, and fire-clay, substantially as set forth.

HENRY BAGGELEY.

Witnesses:
 HY. JAS. NOONE,
 JAS. EDWARDS.